(12) United States Patent
Park

(10) Patent No.: US 8,229,412 B2
(45) Date of Patent: Jul. 24, 2012

(54) DETERMINING WHETHER SYSTEM INFORMATION CAN BE REUSED AND MANAGING SYSTEM INFORMATION IN A WIRELESS COMMUNICATION SYSTEM

(75) Inventor: Kenneth James Park, Cathlamet, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 230 days.

(21) Appl. No.: 12/572,403

(22) Filed: Oct. 2, 2009

(65) Prior Publication Data

US 2011/0081898 A1    Apr. 7, 2011

(51) Int. Cl.
    *H04M 3/00* (2006.01)
(52) U.S. Cl. ........................................... 455/418
(58) Field of Classification Search .................. 455/418
    See application file for complete search history.

(56) References Cited

U.S. PATENT DOCUMENTS

| | | | |
|---|---|---|---|
| 5,404,355 A | 4/1995 | Raith | |
| 6,628,946 B1 | 9/2003 | Wiberg et al. | |
| 7,174,184 B2 | 2/2007 | Mahkonen et al. | |
| 7,218,936 B2 | 5/2007 | Rinne et al. | |
| 7,346,353 B2 | 3/2008 | Farnsworth et al. | |
| 7,444,142 B2 | 10/2008 | Roberts et al. | |
| 2005/0153700 A1 | 7/2005 | Farnsworth et al. | |
| 2005/0164683 A1 | 7/2005 | Roberts et al. | |
| 2005/0181801 A1 | 8/2005 | Funnell | |
| 2006/0166693 A1 | 7/2006 | Jeong et al. | |
| 2006/0166694 A1 | 7/2006 | Jeong et al. | |
| 2006/0281456 A1 | 12/2006 | Roberts et al. | |
| 2007/0049344 A1 | 3/2007 | Van Der Velde et al. | |
| 2007/0070949 A1 | 3/2007 | Hwang et al. | |
| 2007/0099615 A1 | 5/2007 | Farnsworth et al. | |
| 2008/0039083 A1 | 2/2008 | Muniere et al. | |
| 2008/0225776 A1 | 9/2008 | Alanara | |
| 2008/0273514 A1 | 11/2008 | Kuo | |
| 2009/0098892 A1* | 4/2009 | Trogolo et al. | 455/466 |
| 2010/0296389 A1* | 11/2010 | Khandekar et al. | 370/216 |
| 2010/0303039 A1* | 12/2010 | Zhang et al. | 370/331 |
| 2011/0110315 A1* | 5/2011 | Chen et al. | 370/329 |

OTHER PUBLICATIONS

Panasonic, "System Information Modification Indication in Carrier Aggregation," 3GPP TSG RAN WG2 Meeting #67, R2-094187, Aug. 2009.
Huawei, "Carrier Aggregation in Active Mode," 3GPP TSG-RAN WG2 Meeting #66, R2-093104, May 2009.
International Search Report issued for International Patent Application No. PCT/JP2010/066471 on Dec. 7, 2010.
3GPP TS 36.300 V8.1.0, "Evolved Universal Terrestrial Radio Access (E-UTRA) and Evolved Universal Terrestrial Radio Access Network (E-UTRAN); Overall description," Jun. 2007.

(Continued)

*Primary Examiner* — Nathan Mitchell
(74) *Attorney, Agent, or Firm* — Austin Rapp & Hardman

(57) ABSTRACT

The present disclosure relates to determining whether system information can be reused and managing system information in a wireless communication system. A wireless communication device may read and compare a physical cell identity and specific system information of a target component carrier with the physical cell identity and specific system information of a source component carrier to determine whether generic system information needs to be read or can be reused. A base station may determine whether a change in system information impacts generic system information and specific system information. The base station may update a data control variable such that it is synchronized for particular sets of component carriers.

16 Claims, 11 Drawing Sheets

OTHER PUBLICATIONS

3GPP TS 36.331 V8.5.0, "Evolved Universal Terrestrial Radio Access (E-UTRA) Radio Resource Control (RRC); Protocol specification," Mar. 2009.

3GPP TS 36.321 V8.5.0, "Evolved Universal Terrestrial Radio Access (E-UTRA) Medium Access Control (MAC); Protocol specification," Mar. 2009.

3GPP TS 36.814 V0.4.1, "Further Advancements for E-UTRA; Physical Layer Aspects," Feb. 2009.

3GPP TS 36.214 V8.6.0, "Evolved Universal Terrestrial Radio Access (E-UTRA) Physical layer—Measurements," Mar. 2009.

3GPP TS 36.213 V8.6.0, "Evolved Universal Terrestrial Radio Access (E-UTRA) Physical layer procedures," Mar. 2009.

3GPP TS 36.212 V8.6.0, "Evolved Universal Terrestrial Radio Access (E-UTRA) Multiplexing and channel coding," Mar. 2009.

3GPP TS 36.211 V8.6.0, "Evolved Universal Terrestrial Radio Access (E-UTRA) Physical Channels and Modulation," Mar. 2009.

* cited by examiner

DETERMINING WHETHER SYSTEM INFORMATION CAN BE REUSED AND MANAGING SYSTEM INFORMATION IN A WIRELESS COMMUNICATION SYSTEM

TECHNICAL FIELD

The present disclosure relates generally to wireless communication systems. More specifically, the present disclosure relates to systems and methods for determining whether system information can be reused and managing system information in a wireless communication system.

BACKGROUND

Wireless communication systems have become an important means by which many people worldwide have come to communicate. A wireless communication system may provide communication for a number of wireless communication devices, each of which may be serviced by a base station.

A wireless communication device is an electronic device that may be used for voice and/or data communication over a wireless communication system. A wireless communication device may alternatively be referred to as a mobile station, a user equipment, an access terminal, a subscriber station, a mobile terminal, a remote station, a user terminal, a terminal, a subscriber unit, a mobile device, etc. A wireless communication device may be a cellular phone, a smartphone, a personal digital assistant (PDA), a wireless modem, etc.

A base station is a fixed station (i.e., a wireless communication station that is installed at a fixed location) that communicates with wireless communication devices. A base station may alternatively be referred to as an access point, a Node B, an evolved Node B (eNB), or some other similar terminology.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices. In 3GPP specifications, a wireless communication device is typically referred to as a User Equipment (UE), and a base station is typically referred to as a Node B or an evolved Node B (eNB).

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). LTE-Advanced (LTE-A) is the next generation of LTE.

Systems and methods that may improve the operating efficiency of mobile devices may be beneficial. Such systems and methods are disclosed herein.

DETAILED DESCRIPTION

Figure 1:
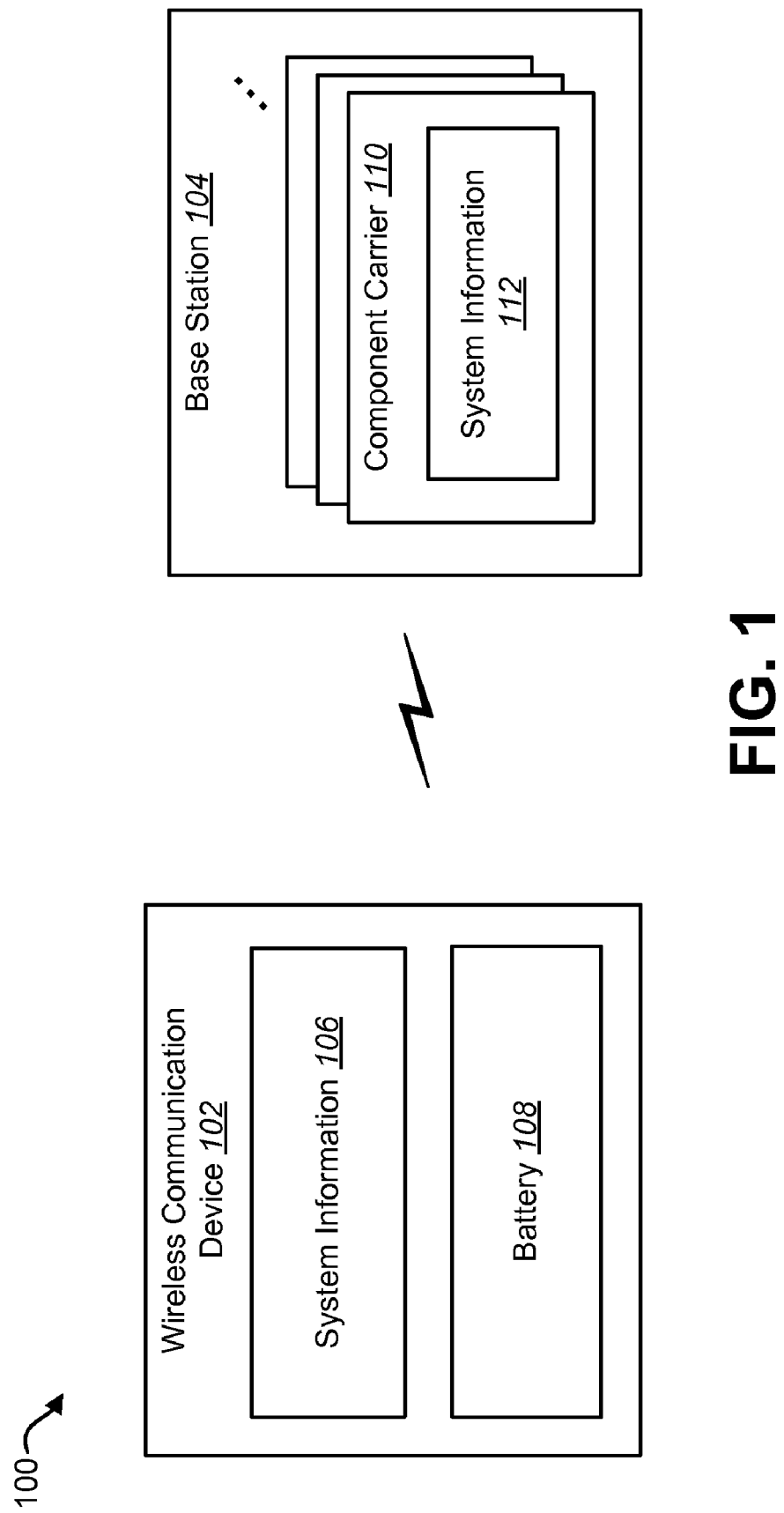
FIG. 1 is a block diagram illustrating a wireless communication system that includes a wireless communication device and a base station.

For clarity, at least some aspects of the systems and methods disclosed herein will be described in relation to the 3GPP LTE and LTE-Advanced standards (Release-8 and Release-10). However, the scope of the present disclosure should not be limited in this regard. The systems and methods disclosed herein may be utilized in other types of wireless communication systems (e.g., WiMax).

The 3GPP LTE-A specifications will include functionality known as Carrier Aggregation (CA) that will enable separate bands of spectrum to be aggregated into components. Each component band may be known as a Component Carrier (CC). For example, given a maximum bandwidth of 100 MHz, there may be (up to) 5 component bands. That is, there may be 5 CCs of 20 MHz each. A wireless communication device may communicate with a base station via a CC. A CC may be a "standalone" CC, which may provide all of the services of a cell.

When a wireless communication device transitions from one CC to another, it typically may read all of the system information associated with the new component carrier. Given that LTE-A Carrier Aggregation (CA) functionality may provide for multiple CCs within the same cell, it is expected that much of the system information of each CC within a cell may be the same. Therefore, re-reading all of the system information provided by the new CC may be unnecessary and may waste the wireless communication device's battery (and other) resources. Thus, a method to determine whether the system information broadcast by any of the standalone CCs of a cell is the same or different may help to avoid wasting a wireless communication device's battery resources unnecessarily.

The methods described herein may determine whether the system information broadcast by any of the standalone CCs of a cell is the same or different. Thus, when a wireless communication device changes from one standalone CC of a cell to another standalone CC of the same cell, the wireless communication device may decide whether or not it is necessary to read all of the system information provided by the new CC.

A method for determining whether system information can be reused on a wireless communication device is disclosed. System information that is specific to a target component carrier is read. A physical cell identity of a base station is read.

It is determined whether the physical cell identity of the target component carrier is the same as the physical cell identity of a source component carrier.

The system information that is specific to the target component carrier may be stored if the physical cell identity of the target component carrier is the same as the physical cell identity of a source component carrier.

In one configuration, if the physical cell identity of the target component carrier is not the same as the physical cell identity of the source component carrier, system information that is generic to one or more component carrier(s) may be read. The physical cell identity of the target component carrier may also be stored. The system information that is specific to the target component carrier may also be stored. The system information that is generic to one or more component carrier(s) may also be stored.

Pursuant to 3GPP LTE-A Release-8 specifications, the system information that is specific to the target component carrier may include a MasterInformationBlock (MIB) and one or more SystemInformationBlocks (SIBS), the wireless communication device may be User Equipment (UE), and the base station may be an evolved Node B (eNB).

In another configuration, if the physical cell identity and system information that is specific to a component carrier or system information that is generic to one or more component carrier(s) is not stored on the wireless communication device, system information that is generic to one or more component carrier(s) may be read. The physical cell identity of the target component carrier may also be stored. The system information that is specific to the target component carrier may also be stored. The system information that is generic to one or more component carriers may also be stored.

It may be determined whether a data control variable of the target component carrier is the same as a data control variable of the source component carrier. If the data control variable of the target component carrier is not the same as the data control variable of the source component carrier, system information that is generic to one or more component carriers may be read. The physical cell identity of the target component carrier may be stored. The system information that is specific to the target component carrier may be stored. The system information that is generic to one or more component carriers may be stored. The data control variable may be a SystemInfoValueTag (SIVT) pursuant to 3GPP LTE-A Release-8 specifications.

A method for changing system information of a cell in a wireless communication system is also disclosed. It is determined whether there are multiple standalone component carriers in the cell. If there are multiple standalone component carriers in the cell, it is determined if the system information is synchronized among multiple component carriers in the cell. If the system information is not synchronized, the system information is changed and a value of a data control variable is updated. If the system information is synchronized, it is determined if new system information impacts certain system information. If there are not multiple standalone component carriers in the cell, the system information is changed and the value of a data control variable is changed.

The certain system information may include system information that is generic to one or more component carriers. If the new system information impacts system information that is generic to one or more component carriers, sets of component carriers that are used to transmit shared generic system information may be identified. For each set for which there is new generic system information, the generic system information for the set may be changed, a set of invalid data control variables may be identified, and a value of a data control variable for the set may be updated. It may also be determined if the updated value of the data control variable is a member of the set of invalid data control variables. The value of the data control variable for the set may be updated if the updated value of the data control variable is a member of the set of invalid data control variables.

Furthermore, pursuant to 3GPP LTE-A Release-8 specifications, the system information that is generic to one or more component carriers may include one or more SystemInformationBlocks (SIBs), and the data control variable may be a SystemInfoValueTag (SIVT).

The certain system information may include system information that is specific to a component carrier. If the new information impacts system information that is specific to a component carrier, sets of component carriers that are used to transmit shared generic system information may be identified. For each set for which there is new specific system information, the specific system information for the set may be changed, a set of invalid data control variables may be identified, and a value of a data control variable for the set may be updated. It may also be determined if the updated value of the data control variable is a member of the set of invalid data control variables. The value of the data control variable for the set may be updated if the updated value of the data control variable is a member of the set of invalid data control variables.

Furthermore, pursuant to 3GPP LTE-A Release-8 specifications, the system information that is generic to one or more component carriers may include one or more SystemInformationBlocks (SIBs), the system information that is specific to the component carrier may include a MasterInformationBlock (MIB) and one or more SystemInformationBlocks (SIBs), and the data control variable may be a SystemInfoValueTag (SIVT).

The certain system information may include system information that is generic to one or more component carriers, specific to a component carrier, or both. If the new information impacts system information that is generic to one or more component carriers, specific to a component carrier, or both, sets of component carriers that are used to transmit shared generic system information may be identified. For each set for which there is new specific or generic system information, the generic system information for the set may be changed if the system information is generic to one or more component carriers, the specific system information for the set may be changed if the system information is specific to a component carrier, a set of invalid data control variables may be identified, and a value of a data control variable for the set may be updated. It may also be determined if the updated value of the data control variable is a member of the set of invalid data control variables. The value of the data control variable for the set may be updated if the updated value of the data control variable is a member of the set of invalid data control variables.

Furthermore, pursuant to 3GPP LTE-A Release-8 specifications, the system information that is generic to one or more component carriers may include one or more SystemInformationBlocks (SIBS), the system information that is specific to the component carrier may include a MasterInformationBlock (MIB) and one or more SystemInformationBlocks (SIBS), and the data control variable may be a SystemInfoValueTag (SIVT).

An wireless device that is configured for determining whether system information can be reused on a wireless communication device is also disclosed. The apparatus includes a processor and memory in electronic communication with the processor. Executable instructions are stored in the memory.

The instructions are executable to read system information that is specific to a target component carrier. The instructions are also executable to read a physical cell identify of a base station. The instructions are also executable to determine whether the physical cell identity of the target component carrier is the same as the physical cell identity of a source component carrier.

A base station that is configured for changing system information of a cell in a wireless communication system is also disclosed. The apparatus includes a processor and memory in electronic communication with the processor. Executable instructions are stored in the memory. The instructions are executable to determine if there are multiple standalone component carriers in the cell. The instructions are also executable to change the system information and update the value of a data control variable if there are not multiple standalone component carriers in the cell. The instructions are also executable to determine if the new system information impacts certain system information if there are multiple standalone component carriers in the cell.

FIG. 1 is a block diagram illustrating a wireless communication system 100 that includes a wireless communication device 102 and a base station 104. The wireless communication device 102 is an electronic device that may be used for voice and/or data communication over a wireless communication network, such as a cellular network. The wireless communication device 102 may be a cellular phone, a smart phone, a personal digital assistant (PDA), a card in a laptop or personal computer, etc. The wireless communication device 102 may include a battery 108. The base station 104 may facilitate wireless communication between the wireless communication device 102 and a network. The base station 104 may be a fixed station that contains radio frequency transmitters and receivers that are used to communicate with wireless communication devices, which may move freely around the base station 104. The base station 104 may support a cell. A cell refers to an area of wireless service coverage.

The wireless communication device 102 and the base station 104 may be configured to operate in accordance with an LTE-Advanced standard. The 3GPP LTE-A specifications will include functionality known as Carrier Aggregation (CA) that may enable separate bands of spectrum to be aggregated into components. For example, if a base station 104 is given a maximum bandwidth of 100 MHz, there may be up to 5 component bands of 20 MHz each. Each component band may be known as a Component Carrier (CC). Wireless electronic communication may occur between the wireless communication device 102 and the base station 104 via one of the available CCs.

A "standalone" CC may be configured to provide all of the services of a cell. The 3GPP RAN-1 (Radio Access Network or Radio Layer 1) has identified three types of CCs for LTE-A. The first type is backwards compatible with Release-8 and may standalone or be a part of a CA. The second type is not backwards compatible with Release-8, but may standalone or be a part of a CA. The third type may be known as extension carrier, and cannot standalone and may need to be paired with a standalone CC. Unless otherwise noted, the term Component Carrier (CC) refers to a standalone CC hereinafter. For example, "CC" may refer to the first or second type of standalone CC. The cell of a base station 104 may have multiple standalone CCs 110. The CCs 110 that are assigned to a cell may broadcast System Information (SI) 112. The wireless communication device 102 may receive and store SI 106 in a cache or memory. SI 112 may include information that is important to system functionality. For example, the SI 112 may include cell access information, cell selection information, frequency band, scheduling information, radio resource configuration information, cell reselection information, neighbor cell information, Home eNodeB information, and emergency broadcast information.

Figure 2:
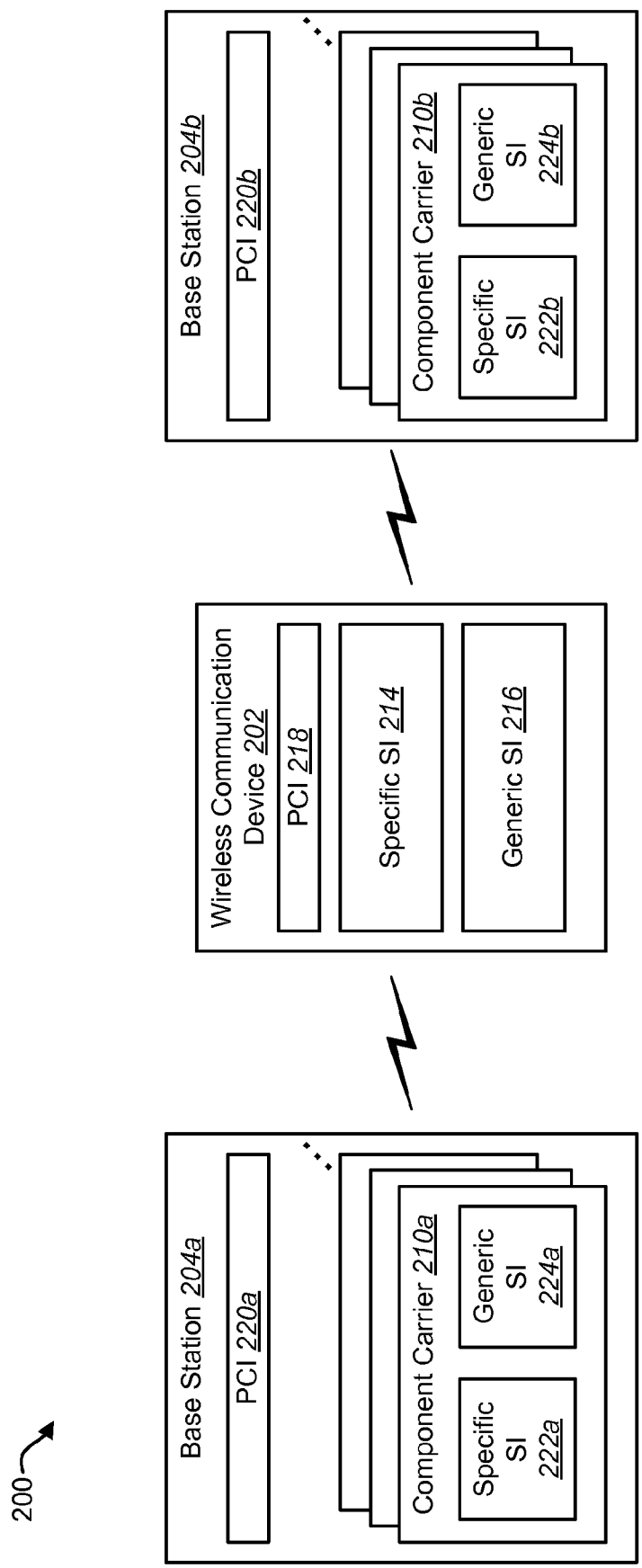
FIG. 2 is a block diagram illustrating a wireless communication system that includes a wireless communication device and two base stations.

FIG. 2 is a block diagram illustrating a wireless communication system 200 that includes a wireless communication device 202 and two base stations 204a-b. A first base station 204a may be configured to transmit using multiple CCs 210a. A second base station 204b may also be configured to transmit using multiple CCs 210b. The CCs 210a in the base station 204a may each be used to broadcast specific SI 222a, generic SI 224a and a Physical Cell Identity (PCI) 220a. The CCs 210b in the base station 204b may similarly be used to broadcast specific SI 222b, generic SI 224b, and a PCI 220b. Specific SI 222 may be system information that is specific to a particular CC 210. Generic SI 224 may be system information 112 that is the same for every CC 210 in a cell. For example, a CC 210a in a cell may have SI 222a that is specific to the CC 210a. All of the CCs 210a in a cell may also have generic SI 224a (SI that may be the same for all of the CCs 210a of the cell and base station 204a). The PCI 220 may be independent of the SI 222, 224 and may be broadcast separately on the Primary Sync Channel (PSC).

In contrast to standalone CCs 210, a CC that cannot standalone may not transmit general broadcast data, i.e., it may transmit some of the SI 222, 224, but not all. Furthermore, a CC that cannot standalone may not provide network access service, i.e., it may not provide security authentication procedures, so the wireless communication device 202 cannot make a connection to the system network. The basic idea for a CC that cannot standalone is that it provides only a data pipe with as little control as possible in order to maximize the data pipe bandwidth. The missing control information may then be provided by an associated stand-alone CC A PCI 220 may be a unique identifier that differentiates each cell in a Public Land Mobile Network (PLMN). For example, there may be 504 unique PCIs pursuant to the 3GPP LTE standard. An LTE-A base station 204a that supports CA may be configured such that each CC 210a assigned to the cell may share the same PCI 220a. Another base station 204b may be similarly configured such that each CC 210b assigned to the cell may share the same PCI 220b. For example, the PCI 220a may be generic to (i.e., the same for) all of the CCs 210a in the cell associated with the base station 204a.

The wireless communication device 202 may be in wireless communication with one base station (e.g., base station 204a or base station 204b) or may be simultaneously in communication with both base stations 204a-b. The wireless communication device 202 may also transition from being in the cell associated with base station 204a to being in the cell associated with base station 204b. This transition may be referred to as a "reselection" while in "Idle_Mode" or as a "selection" while in "Connected_Mode." Typically when a wireless communication device 202 leaves one cell and enters another cell, it may read the broadcasted SI according to the LTE Release-8 specification. In Release-8, the terms "source cell" and "target cell" refer to the "before" and "after" cells (respectively) when a wireless communication device 202 changes from one cell to the next. For example, if a wireless communication device 202 leaves the "serving" or "source" cell (e.g., the cell associated with base station 204a) and enters the "target" cell (e.g., the cell associated with base station 204b), it may read the SI (e.g., both the specific SI 222b and the generic SI 224b) and the PCI 220b broadcast by the "target" cell. The wireless communication device 202 may also store a PCI 218 as well as specific SI 214 and generic SI 216.

Figure 3:
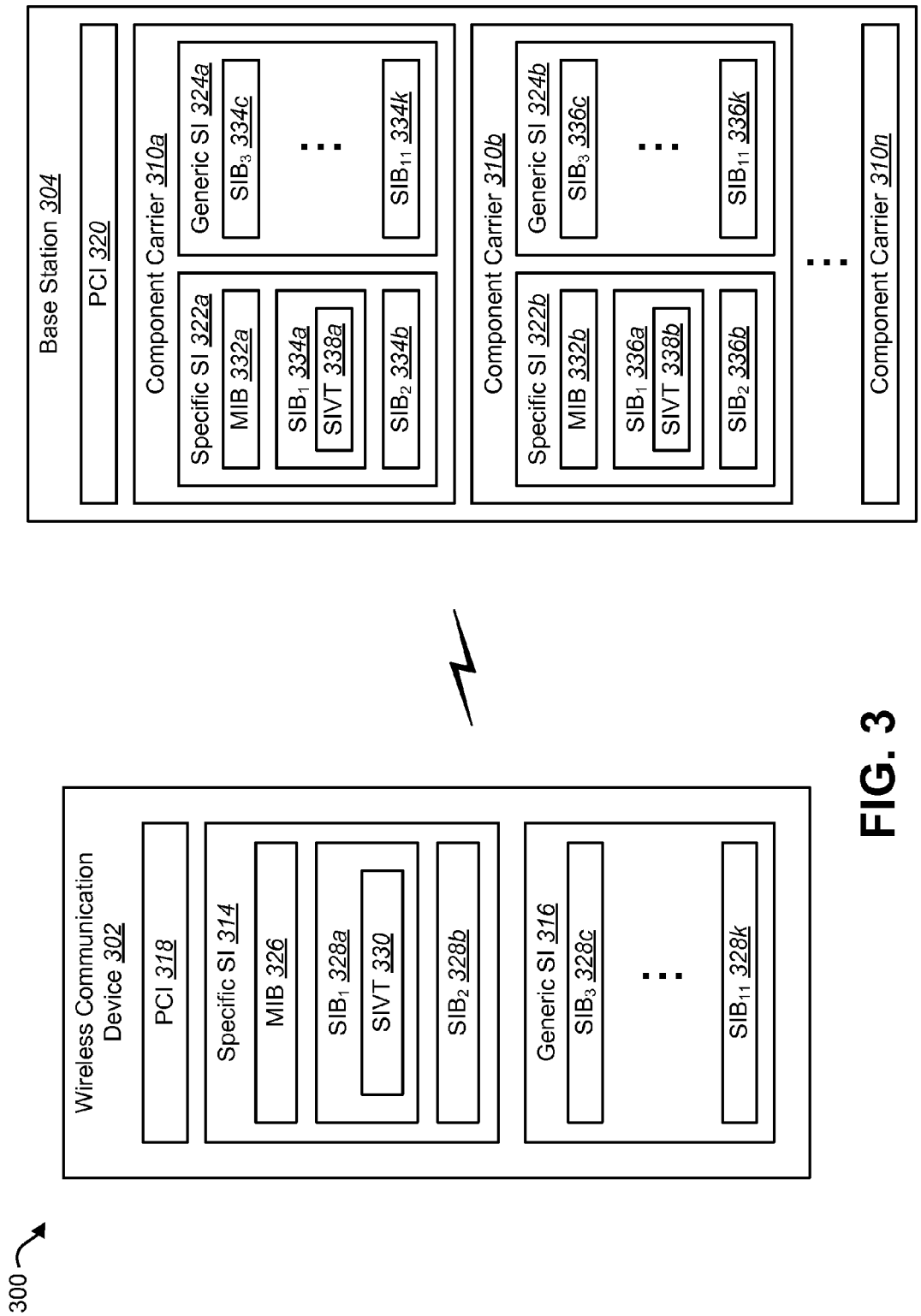
FIG. 3 is a block diagram illustrating a wireless communication device and a base station in a wireless communication system.

FIG. 3 is a block diagram illustrating a wireless communication device 302 and a base station 304 in a wireless communication system 300. The base station 304 may have a PCI 320 and several CCs 310a-n. As discussed above, each CC 310a-n may be used to broadcast specific and generic SI. That is, one CC 310a may be used to broadcast specific SI 322a and generic SI 324a. Similarly, another CC 310b may be used to broadcast specific SI 322b and generic SI 324b. The Release-8 specification divides SI into the MasterInformationBlock (MIB) and a number of SystemInformationBlocks ($SIB_{1...11}$). The MIB, $SIB_1$ and $SIB_2$ may carry information that is specific to a carrier frequency (e.g., a CC) and the remainder of the SIBs may carry information that is generic to the system (i.e., the cell and base station 304). For example, specific SI 322a broadcast on a CC 310a may include an MIB 332a, $SIB_1$ 334a and $SIB_2$ 334b. Generic SI 324a broadcast on a CC 310a may include several SIBs, such as $SIB_3$ 334c through $SIB_{11}$ 334k, for example. Furthermore, specific SI 322b broadcast on a CC 310b may include an MIB 332b, $SIB_1$ 336a and $SIB_2$ 336b. Generic SI 324b broadcast on a CC 310b may include several SIBs, such as $SIB_3$ 336c through $SIB_{11}$ 336k, for example. Although reference is made to the MIB and several SIBs, the systems and methods disclosed herein are not limited to a certain number of information blocks. The specific SI and generic SI may be structured in any manner known in the art.

The base station 304 may configure the generic SI messages such that they are identical for two or more CCs 310a-n of a cell. For example, the generic SI 324a on the CC 310a may be identical to the generic SI 324b on the CC 310b. However, the specific SI 322a on the CC 310a may not be identical to the specific SI 322b on the CC 310b. It should also be noted that the PCI 320 may be considered to be generic as to the CCs 310a-n, since the PCI 320 may be the same for all of the CCs 310a-n in the cell associated with base station 304.

The system 300 may also employ a data control variable. The Release 8 specification employs such a data control variable known as a SystemInfoValueTag (SIVT). This variable may be broadcast as part of the $SIB_1$. For example, the SIVT 338a may be broadcast as part of the $SIB_1$ 334a, while the SIVT 338b may be broadcast as part of the $SIB_1$ 336a. The SIVT may indicate the state of information broadcast in the SI. For example, when a change in MIB or SIB data to be broadcasted occurs, the SIVT may also change to reflect the new state of the MIB and SIB data set. Upon returning from out of coverage, a wireless communication device 302 may use the SIVT to determine if the previously stored SI messages are still valid. Furthermore, a wireless communication device 302 may consider stored SI to be invalid after 3 hours. For example, the base station 304 may modify the SI broadcast on the CCs 310a-n. When the SI broadcast on the CC 310a is modified, the SIVT 338a may change to reflect that modification. Similarly, when the SI broadcast on the CC 310b is modified, the SIVT 338b may change to reflect that modification. When a base station configures the generic SI messages to be identical for two or more CCs in a cell, the value of each SIVT broadcast may also be the same. For example, when the base station 304 has configured the generic SI messages 324a-b to be identical for CC 310a and CC 310b, the value of the SIVTs 338a-b broadcast in the $SIB_1$s 334a, 336a may also be the same.

The wireless communication device 302 may read and/or store a PCI 318, specific SI 314, and generic SI 316 in a cache or memory. The specific SI 314 stored by the wireless communication device 302 may include an MIB 326, $SIB_1$ 328a and $SIB_2$ 328b. The $SIB_1$ 328a may include an SIVT 330. The generic SI 316 stored on the wireless communication device 302 may include several SIBs, such as $SIB_2$ 328c through $SIB_{11}$ 328k, for example.

It may be beneficial for the wireless communication device 302 to transition from receiving information from one CC 310a to another CC 310b. For example, if substantial interference exists on one CC 310a, then it may be beneficial for the wireless communication device 302 to transition to receiving information on another CC 310b where less interference may exist. This may allow greater reliability and energy savings for the wireless communication device 302. Additionally, the base station 304 may request a change from one CC 310a to another CC 310b to equalize the total number of wireless communication devices 302 between the CC 310, i.e., load balancing. Communication systems 300 may do this primarily to optimize resource utilization, or a variety of other reasons.

In Release-10, new terminology is introduced: "Source Standalone CC" and "Target Standalone CC", which refers to the "Before" and "After" standalone CCs, respectively, when a wireless communication device 302 changes from one standalone CC to another. When the wireless communication device 302 transitions from a "source" CC 310a to a "target" CC 310b, the wireless communication device 302 may typically read the SI (e.g., specific SI 322b and generic SI 324b) associated with the new CC 310b. This may occur, for example, for a Release-10 wireless communication device 302 that changes CCs whether in a connected mode or an idle mode. In many instances, some (but not all) of the SI broadcast by the CCs on the same base station 304 may be the same. Therefore, re-reading all of the SI provided by the new CC may be unnecessary and may waste a wireless communication device's battery resources. For example, assume that the wireless communication device 302 was connected to the base station 304 via the CC 310a. The wireless communication device 302 had read both the specific SI 322a and the generic SI 324a broadcast by the CC 310a, in addition to the PCI 320. The wireless communication device 302 may have stored the PCI 318, as well as the specific SI 314 and the generic SI 316. However, upon transitioning to CC 310b, the wireless communication device 302 may not only read the specific SI 322b from the CC 310b, but may also read the generic SI 324b, which may be identical to the generic SI 316 (i.e., from the generic SI 324a) that the wireless communication device 302 has already stored. It may therefore waste a wireless communication device's battery 108 resources to re-read and store the generic SI 324b broadcast by CC 310b when transitioning from CC 310a to CC 310b. Thus, methods to avoid re-reading and storing the generic SI when unnecessary may help to conserve a wireless communication device's battery 108 resources.

Figure 4:
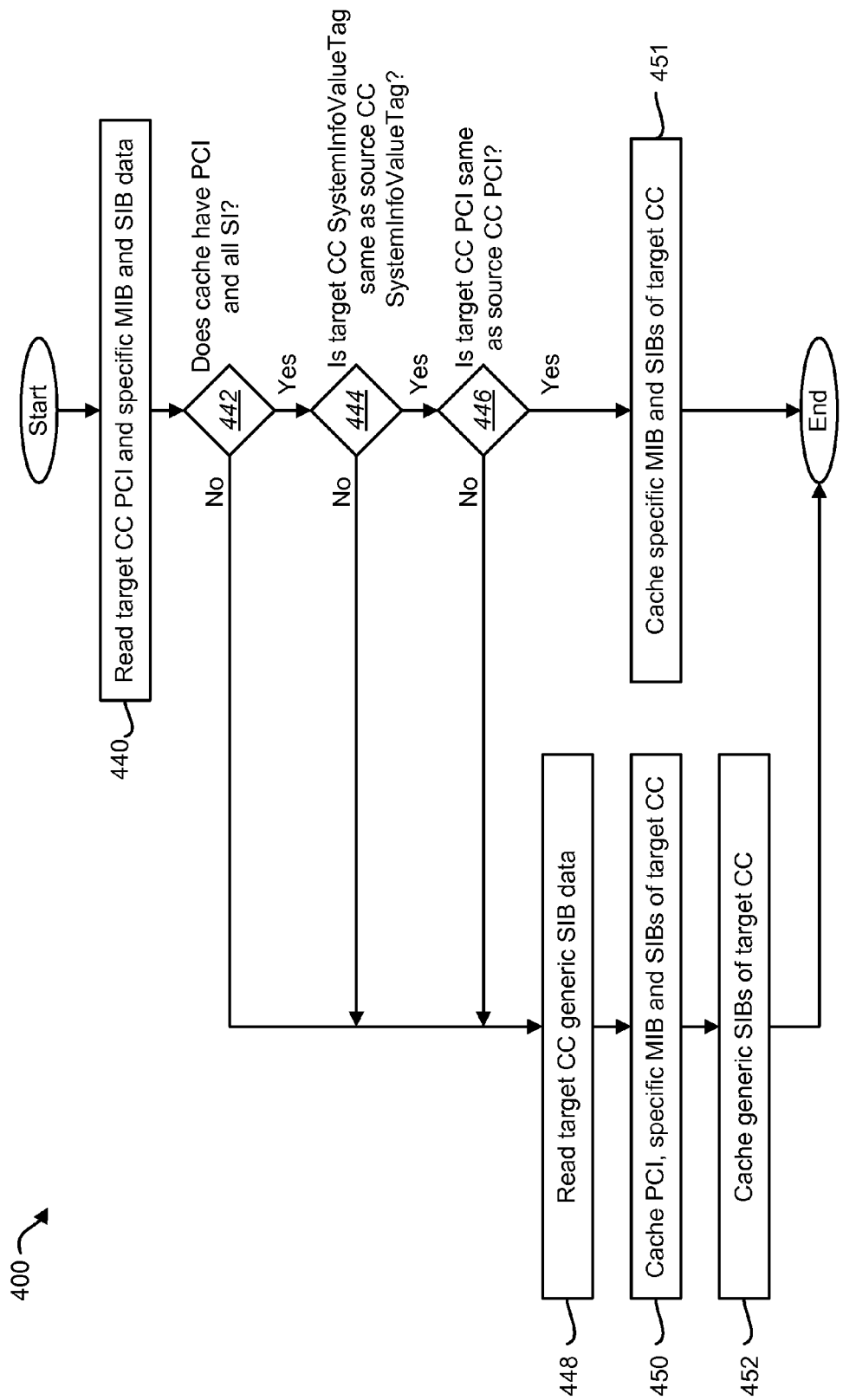
FIG. 4 is a flow diagram illustrating a method for determining whether system information can be reused on a wireless communication device.

FIG. 4 is a flow diagram illustrating a method 400 for determining whether system information can be reused on a wireless communication device. When a wireless communication device selects or reselects between CCs, the wireless communication device may compare the PCI and SIVT of the target CC with the PCI and SIVT of a source CC. The wireless communication device can thus determine whether the generic SI in the target CC SIBs is already stored in the wireless communication device's cache or memory. This method 400 may thus use the PCI to confirm that the target CC is part of the same cell as the source CC. When both the source CC and target CC are in the same cell, the same generic SIB information may be broadcast by both the source and target. In that case, the wireless communication device may have already read the generic SIB information while connected or camped on the source CC, and may not need to re-read it from the target CC.

More specifically, FIG. 4 illustrates a method 400 where a wireless communication device may read certain SI after selection or reselection to determine if the target CC and source CC are from the same cell, and thus determine whether generic SI (e.g., $SIB_3$ through $SIB_{11}$) in a cache or memory may be re-used. When a wireless communication device selects or reselects from a source CC to a target CC of a cell, the wireless communication device may read 440 a PCI and specific SI (e.g., MIB, $SIB_1$ and $SIB_2$) data of a target CC. (It should be noted that the SIVT is part of the $SIB_1$ and may be considered to be information that is specific to a CC.) The wireless communication device may determine 442 whether its cache or memory already contains a PCI and all SI (e.g., specific and generic SI). If the wireless communication device detects that it does not have specific SI (e.g., MIB, $SIB_1$ and $SIB_2$) or generic SI (e.g., $SIB_3$ through $SIB_{11}$) stored in its cache or memory, then the wireless communication device may read 448 generic SIB data (e.g., $SIB_3$ through $SIB_{11}$) from the target CC. The wireless communication device may then cache or store 450 the PCI and specific SI (e.g., MIB, $SIB_1$ and $SIB_2$ data) of the target CC. The wireless communication device may also cache or store 452 the generic SI (e.g., $SIB_3$ through $SIB_{11}$) of the target CC. The wireless communication device may thus use the new PCI and SI (e.g., MIB, and $SIB_1$ through $SIB_{11}$) data stored in its cache or memory.

If the wireless communication device's cache or memory contains a PCI and all SI, then the wireless communication device may determine 444 whether the SIVT of the target CC is the same as the SIVT of the source CC. If the SIVT of the target CC is different from the SIVT of the source CC, then the wireless communication device may read 448 generic SIB data (e.g., $SIB_3$ through $SIB_{11}$) from the target CC. The wireless communication device may then cache or store 450 the PCI and specific SI (e.g., MIB, $SIB_1$ and $SIB_2$ data) of the target CC. The wireless communication device may also cache or store 452 the generic SI (e.g., $SIB_3$ through $SIB_{11}$) of the target CC. The wireless communication device may then use the new PCI and SI (e.g., MIB, and $SIB_1$ through $SIB_{11}$) data stored in its cache or memory.

If the SIVT of the target CC is the same as the SIVT of the source CC, then the wireless communication device may determine 446 whether the PCI of the target CC is the same as the PCI of the source CC. If the PCI of the target CC is different from the PCI of the source CC, then the wireless communication device may read 448 generic SIB data (e.g., $SIB_3$ through $SIB_{11}$) from the target CC. The wireless communication device may then cache or store 450 the PCI and specific SI (e.g., MIB, $SIB_1$ and $SIB_2$ data) of the target CC. The wireless communication device may also cache or store 452 the generic SI (e.g., $SIB_3$ through $SIB_{11}$). The wireless communication device may then use the PCI and SI (e.g., MIB, and $SIB_1$ through $SIB_{11}$) data stored in its cache or memory. If the PCI of the target CC is the same as the PCI of the source CC, then the wireless communication device may not need to read the generic SI (e.g., $SIB_3$ through $SIB_{11}$) from the target CC. The generic SI may already be cached in the wireless communication device from the source CC or other previous CC with the same PCI and SIVT. The wireless communication device may then cache or store 451 the specific SI (e.g., MIB, $SIB_1$ and $SIB_2$ data) of the target CC.

Figure 5:
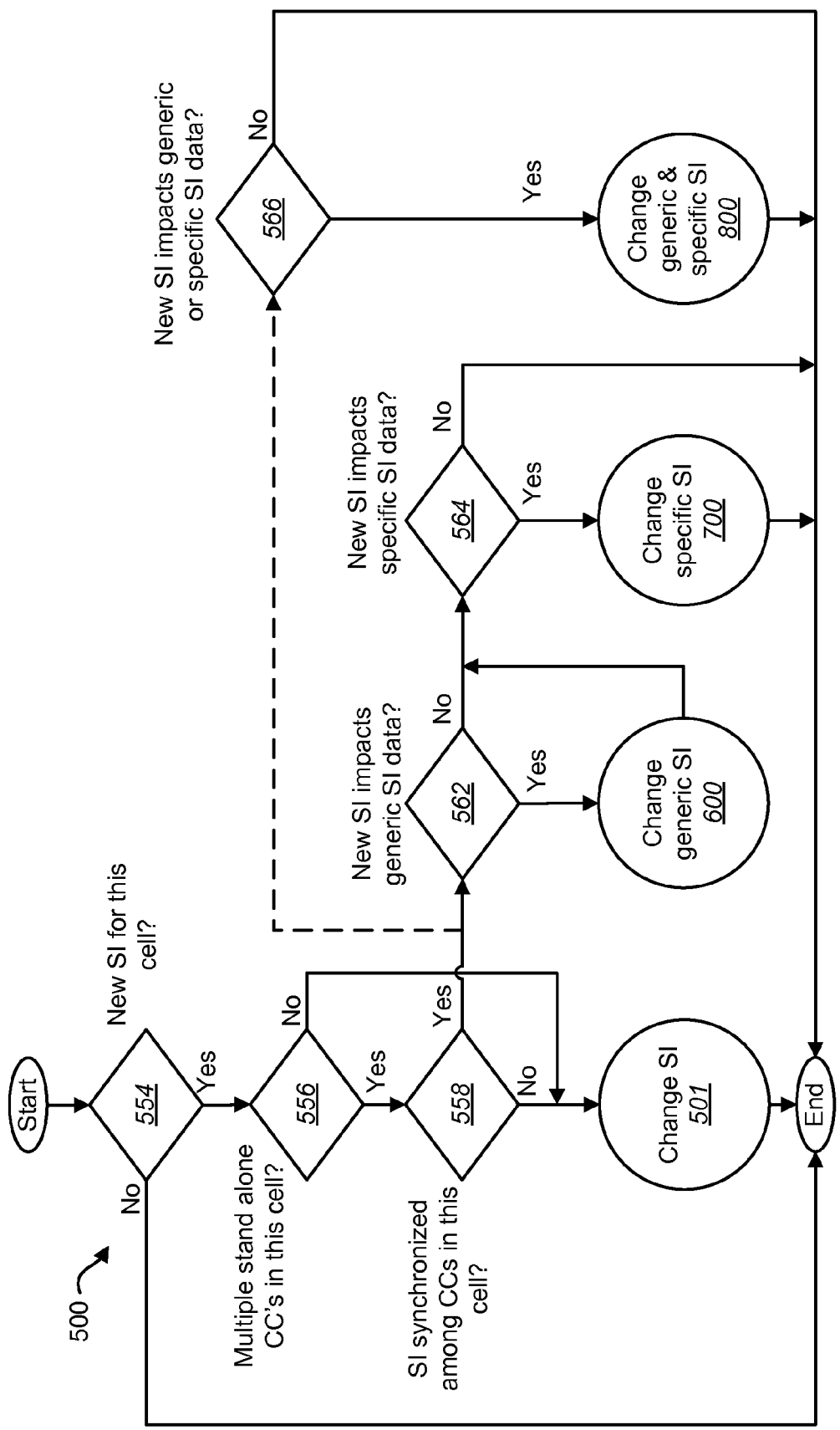
FIG. 5 is a flow diagram illustrating a method for managing the system information of a cell.

FIG. 5 is a flow diagram illustrating a method 500 for managing the SI of a cell. A base station may occasionally need to change specific SI messages in a cell for a CC that shares identical generic SI as other CCs of the cell. In this case, the base station may make and broadcast the changes to the specific SI messages of the CC, update and broadcast the SIVT for that CC and update and broadcast the SIVT of the other CCs that share the identical generic SI. The SIVT may thus remain the same (i.e., synchronized) for those CCs that broadcast identical generic SI.

Furthermore, a base station may occasionally need to change generic SI messages for a set of CCs that shares the same SIVT. In this case, the base station may make and broadcast the changes to the generic SI messages used by the set of CCs, and update and broadcast the SIVT for each CC for that set. The SIVT may thus remain the same (i.e., synchronized) for those CCs that broadcast identical generic SI.

Furthermore, a base station may occasionally need to change both the generic SI and the specific SI messages for a set of CCs that shares the same SIVT. In this case, the base station may make and broadcast the changes to the generic SI and specific SI messages used by the set of CCs and update and broadcast the SIVT for each CC for that set. The SIVT may thus remain the same (i.e., synchronized) for those CCs that broadcast identical generic SI.

A base station may configure generic SI messages to be different between CCs of a cell. In that case, the value of SIVTs broadcast in those CCs may be different. When the base station initially configures and/or changes the SIVT of a CC, the base station may ensure that the initial or new value of the SIVT is not the same as any other CCs of that cell that does not share the identical generic SI.

A base station may determine 554 whether there is new SI for a cell. If there is no new SI for the cell, then the operation may end. If there is new SI for the cell, the base station may determine 556 whether there are multiple standalone CCs in the cell. If there are not multiple standalone CCs in the cell, then the base station may proceed to change 501 the SI (as detailed in FIG. 5A).

If there are multiple standalone CCs in the cell, the base station may determine 558 whether the SI is synchronized among the CCs in the cell. If there are multiple CCs in the cell, but none of the SI is synchronized, (i.e., reused), the base station may change 501 the SI (as detailed in FIG. 5A).

If the SI is synchronized among the CCs, the base station may determine 562 whether the new SI impacts generic SI data (e.g., $SIB_3$ through $SIB_{11}$). If the new SI impacts generic SI data, the base station may change 600 the generic SI of a cell (as detailed in FIG. 6). Following the changing 600 of generic SI or if the new SI does not impact the generic SI data, then the base station may determine 564 whether the new SI impacts specific SI data (e.g., MIB, $SIB_1$ and $SIB_2$). If the new SI impacts specific SI data, the base station may change 700 the specific SI (as detailed in FIG. 7), after which the operation may end. If the new SI does not impact specific SI data, then the operation may end.

In an alternative configuration, the base station may determine 566 whether the new SI impacts either the generic SI data (e.g., $SIB_3$ through $SIB_{11}$) and the specific SI data (e.g., MIB, $SIB_1$ and $SIB_2$). If the new SI impacts either the generic and specific SI data, the base station may change 800 the generic SI of a cell, the specific SI of a cell, or both (as detailed in FIG. 8), after which the operation may end. If the new SI does not impact the generic or the specific SI data, then the operation may end. In other words, step 566 and the method detailed in FIG. 8 may be an alternative configuration to performing steps 562 and 564 and the methods detailed in FIGS. 6 and 7.

Figure 5A:
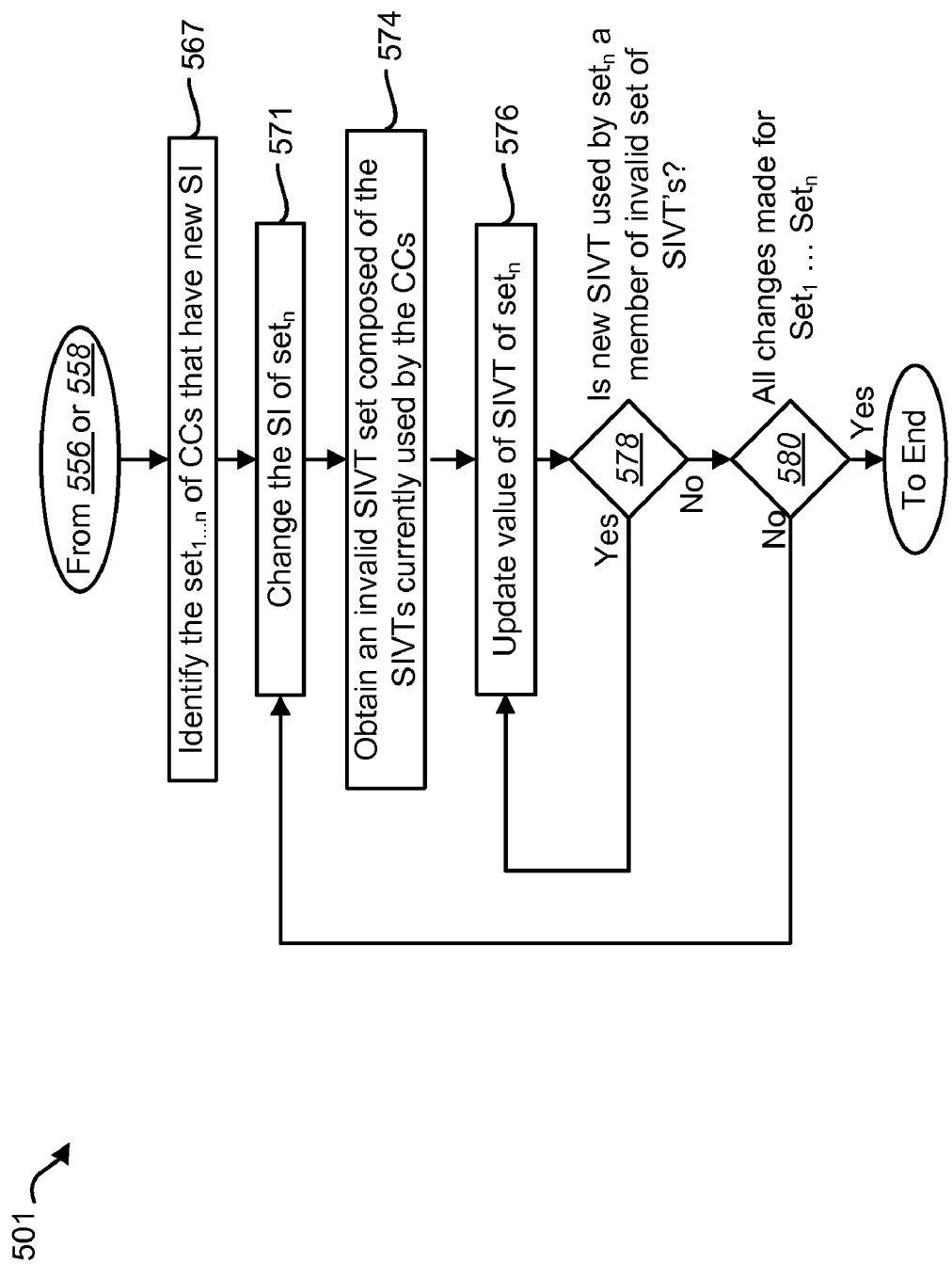
FIG. 5A is a flow diagram illustrating a method for changing system information and managing a data control variable of a cell.

FIG. 5A is a flow diagram illustrating a method 501 for changing system information and managing a data control variable of a cell. The method 501 may change either generic SI or specific SI, or both. The method 501 may begin when the base station determines 556 that there are not multiple standalone CCs in the cell or determines 558 that the SI is not synchronized among the CCs in the cell. The base station may identify 567 the $set_{1...n}$ of CCs that have new SI. The elements of a set may contain 1 or more CCs. The base station may change 571 the SI of that particular set. The base station may obtain 574 an invalid SIVT set. The invalid SIVT set may include the SIVTs currently used by the CCs. The base station may update 576 the value of the SIVT for the set.

The base station may determine 578 whether the new (updated) value of the SIVT of the set is a member of the invalid set of SIVTs. If the new value of the SIVT of the particular set is a member of the invalid set of SIVTs, the base station may update 576 the value of the SIVT of the particular set, e.g., to the next highest SIVT. If the new value of the SIVT of the particular set is not a member of the invalid set of SIVTs, the base station may determine 580 whether all of the required changes have been made for all of the sets. If all of the required changes have been made, the operation may end. If not all of the required changes have been made, the base station may change 571 the SI of a (next) set.

In other words, the idea is to obtain 574 the set of SIVTs currently used by the CCs of the cell and then pick a new SIVT that does not exist in the invalid set. For example, if CC1 and CC2 are sharing SIVT #5, and CC3 is using SIVT #6, the set of invalid SIVTs may be [5,6]. After updating 576 the SIVT for CC1 and CC2, the new SIVT would be #6, which is being used by CC3, and is thus invalid as determined at step 578. Therefore, the base station may update 576 the SIVT to #7, which is not in the invalid SIVT set, and the method 501 may proceed to determine 580 if all changes are made for every set.

Figure 6:
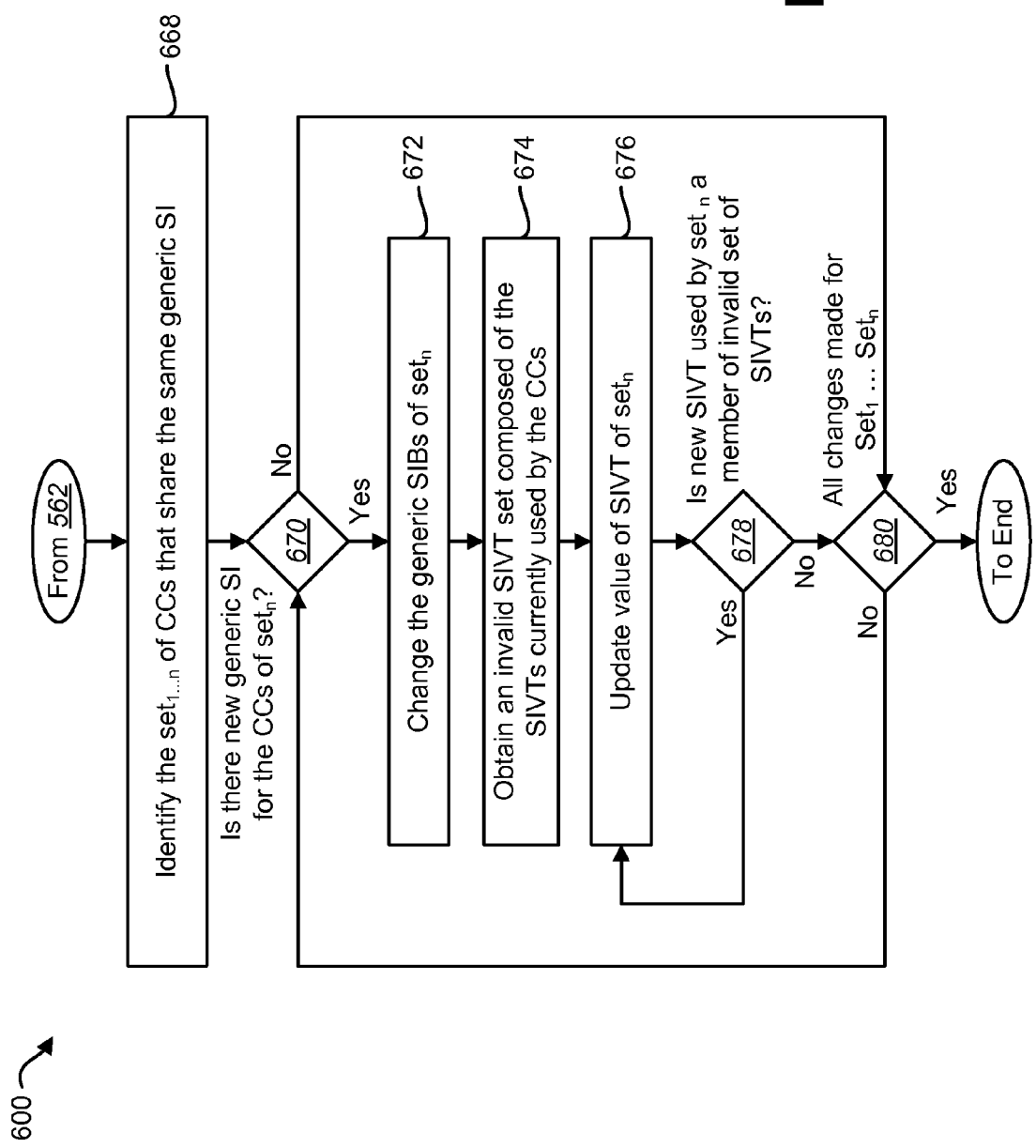
FIG. 6 is a flow diagram illustrating a method for changing generic system information and managing a data control variable of a cell.

FIG. 6 is a flow diagram illustrating a method 600 for changing generic system information and managing a data control variable of a cell. The method 600 may begin when the base station determines 562 that new SI impacts generic SI data (e.g., $SIB_3$ through $SIB_{11}$). The base station may identify 668 the $set_{1...n}$ of CCs that share the same generic SI, i.e., the CCs that are used to transmit shared generic SI. The elements of a set may contain 1 or more CCs. The base station may determine 670 whether there is new generic SI for the CCs of a (next) set. If there is no new generic SI for the CCs of a particular set, then the base station may determine 680 whether all of the required changes have been made for all of the sets. If all of the required changes have been made, the operation may end. If not all of the required changes have been made, the base station may determine 670 whether there is new generic SI for the CCs of a (next) set. If there is new generic SI for the CCs of a particular set, the base station may change 672 the generic SI (e.g., $SIB_3$ through $SIB_{11}$) of that particular set. The base station may obtain 674 an invalid SIVT set. The invalid SIVT set may include the SIVTs currently used by the CCs. The base station may update 676 the value of the SIVT for the set.

The base station may determine 678 whether the new (updated) value of the SIVT of the set is a member of the invalid set of SIVTs. If the new value of the SIVT of the particular set is a member of the invalid set of SIVTs, the base station may update 676 the value of the SIVT of the particular set. If the new value of the SIVT of the particular set is not a member of the invalid set of SIVTs, the base station may determine 680 whether all of the required changes have been made for all of the sets. If all of the required changes have been made, the operation may end. If not all of the required changes have been made, the base station may determine 670 whether there is new generic SI for the CCs of a (next) set.

Figure 7:
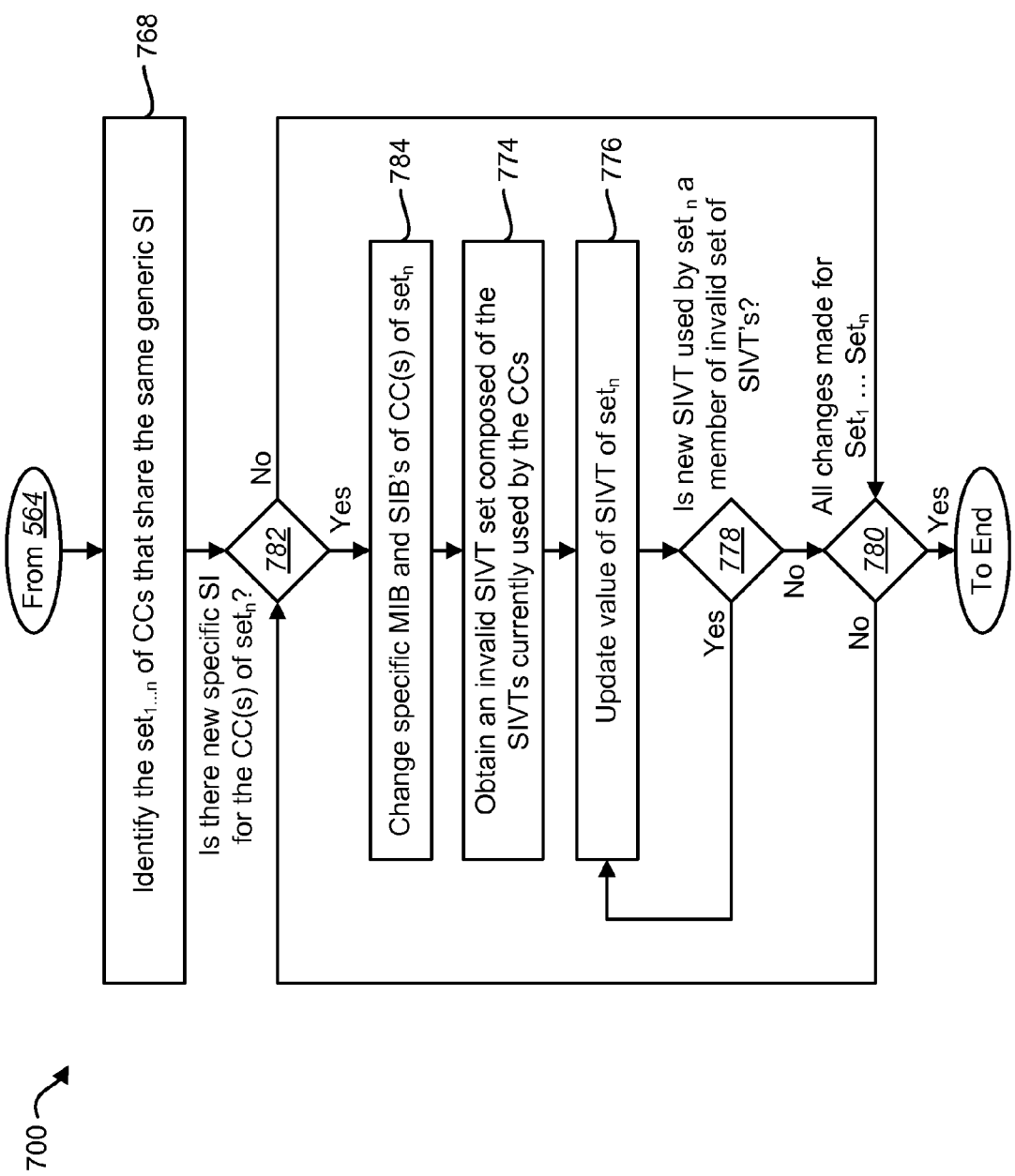
FIG. 7 is a flow diagram illustrating a method for changing specific system information and managing a data control variable of a cell.

FIG. 7 is a flow diagram illustrating a method 700 for changing specific system information and managing a data control variable of a cell. This method 700 may begin when the base station determines 564 that new SI impacts specific SI data (e.g., MIB, $SIB_1$ and $SIB_2$ data). The base station may identify 768 the $set_{1...n}$ of CCs that share the same generic SI, i.e., the CCs that are used to transmit shared generic SI. The elements of a set may contain 1 or more CCs. The base station may determine 782 whether there is new specific SI for the CC(s) of a (next) set. If there is no new specific SI for the CC(s) of a particular set, then the base station may determine 780 whether all of the required changes have been made for all of the sets. If all of the required changes have been made, the operation may end. If not all of the required changes have been made, the base station may determine 782 whether there is new specific SI for the CC(s) of a (next) set. If there is new specific SI for the CC(s) of a particular set, the base station may change 784 the specific SI (e.g., MIB, $SIB_1$ and $SIB_2$) of that particular set. The base station may obtain 774 an invalid SIVT set. The invalid SIVT set may include the SIVTs currently used by the CCs. The base station may update 776 the value of the SIVT for the set.

The base station may determine 778 whether the new (updated) value of the SIVT of the particular set is a member of the invalid set of SIVTs. If the new value of the SIVT of the particular set is a member of the invalid set of SIVTs, the base station may update 776 the value of the SIVT of the particular set. If the new value of the SIVT of the particular set is not a member of the invalid set of SIVTs, the base station may determine 780 whether all of the required changes have been made for that all of the sets. If all of the required changes have been made, the operation may end. If not all of the required changes have been made, the base station may determine 782 whether there is new specific SI for the CCs of a (next) set.

Figure 8:
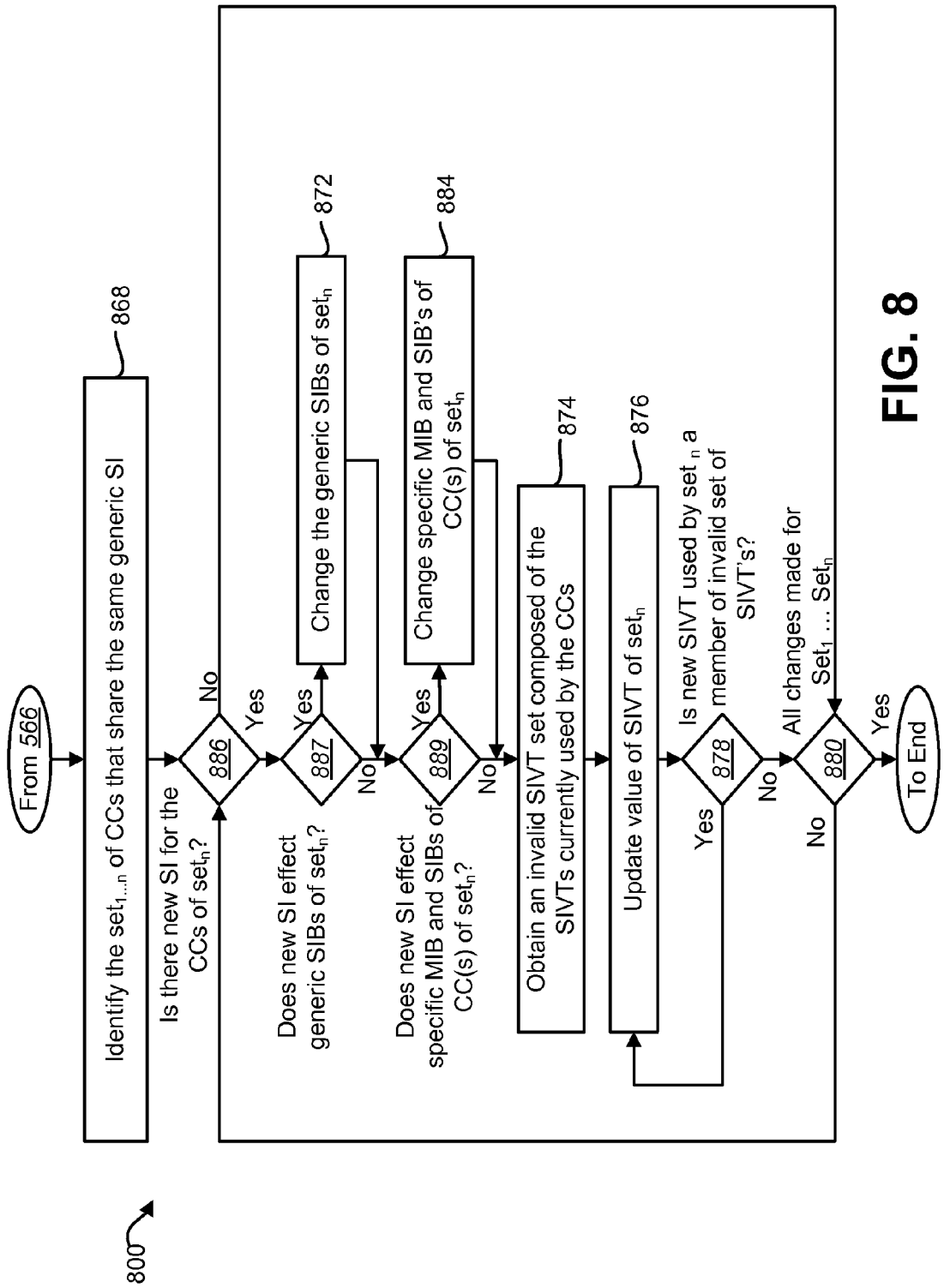
FIG. 8 is a flow diagram illustrating a method for changing generic and specific system information and managing a data control variable of a cell.

FIG. 8 is a flow diagram illustrating a method 800 for changing generic and specific system information and managing a data control variable of a cell. This method 800 may begin when the base station determines 566 that new SI impacts the generic SI (e.g., MIB, $SIB_1$ and $SIB_2$), the specific SI data (e.g., $SIB_3$ through $SIB_{11}$), or both. The base station may identify 868 the $set_{1...n}$ of CCs that share the same generic SI, i.e., the CCs that are used to transmit shared generic SI. The elements of a set may contain 1 or more CCs. The base station may determine 886 whether there is new SI for the CCs of a (next) set. If there is no new SI for the CCs of a particular set, then the base station may determine 880 whether all of the required changes have been made for all of the sets. If all of the required changes have been made, the operation may end. If not all of the required changes have been made, the base station may determine 886 whether there is new SI for the CCs of a (next) set. The base station may determine 887 if the new SI effects generic SIBs of the set. If there is new SI for the CCs of a particular set, the base station may change 872 the generic SI (e.g., $SIB_3$ through $SIB_{11}$) of that particular set. The base station may also determine 889 if the new SI effects specific MIB and SIBs of the CCs in the set. If yes, the base station may change 884 the specific SI (e.g., MIB, $SIB_1$ and $SIB_2$) of that particular set. The base station may obtain 874 an invalid SIVT set. The invalid SIVT set may include the SIVTs currently used by the CCs. The base station may update 876 the value of the SIVT for the set.

The base station may determine 878 whether the new (updated) value of the SIVT of the particular set is a member of the invalid set of SIVTs. If the new value of the SIVT of the particular set is a member of the invalid set of SIVTs, the base station may update 876 the value of the SIVT of the particular set. If the new value of the SIVT of the particular set is not a member of the invalid set of SIVTs, the base station may determine 880 whether all of the required changes have been made for that all of the sets. If all of the required changes have been made, the operation may end. If not all of the required changes have been made, the base station may determine 886 whether there is new SI for the CCs of a (next) set.

Figure 9:
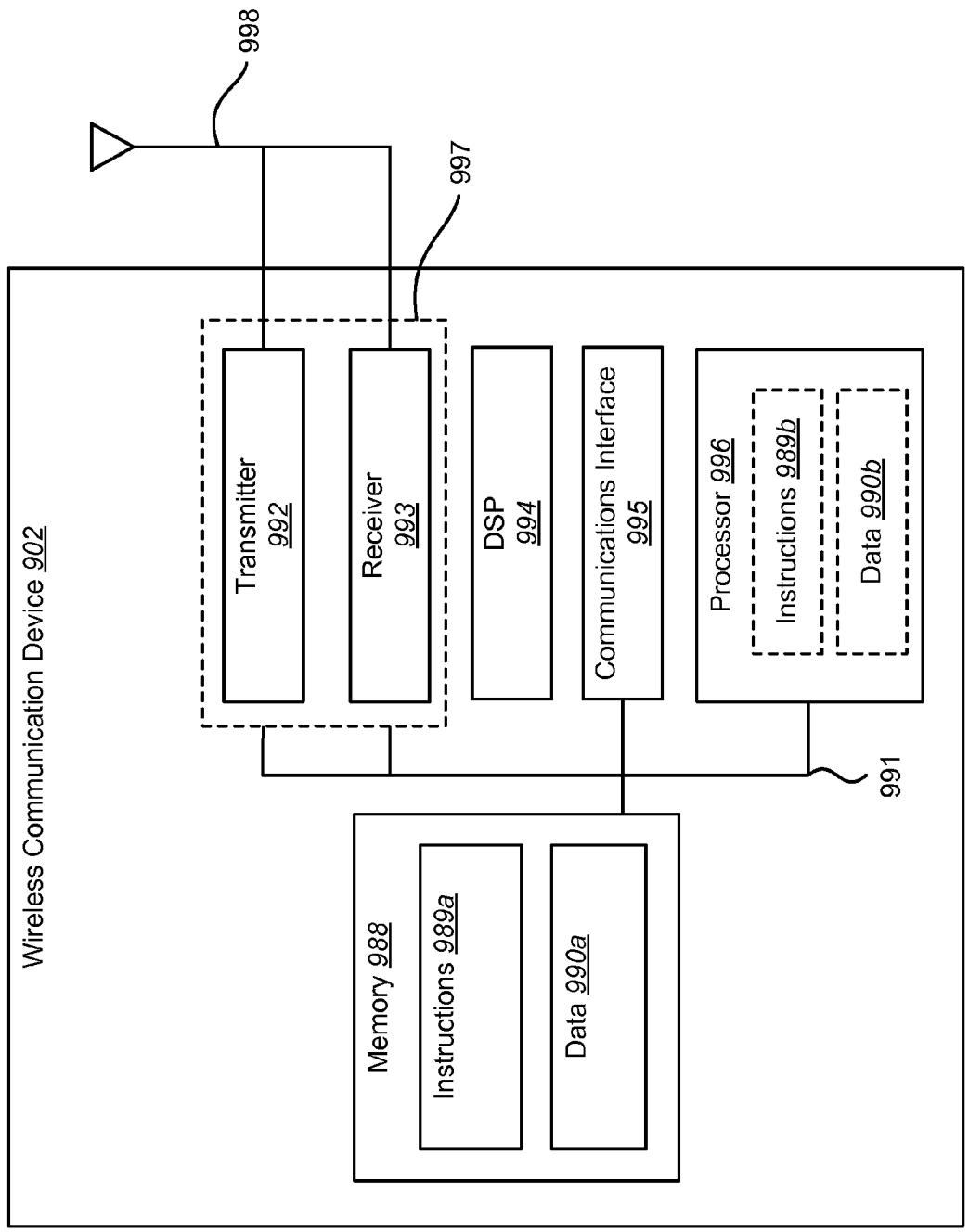
FIG. 9 illustrates various components that may be utilized in a wireless communication device.

FIG. 9 illustrates various components that may be utilized in a wireless communication device 902. The wireless communication device 902 includes a processor 996 that controls operation of the wireless communication device 902. The processor 996 may also be referred to as a CPU. Memory 988, which may include both read-only memory (ROM), random access memory (RAM) or any type of device that may store information, provides instructions 989a and data 990a to the processor 996. A portion of the memory 988 may also include non-volatile random access memory (NVRAM). Instructions 989b and data 990b may also reside in the processor 996. Instructions 989b loaded into the processor 996 may also include instructions 989a from memory 988 that were loaded for execution by the processor 996. The instructions 989b may be executed by the processor 996 to implement the methods disclosed herein.

The wireless communication device 902 may also include a housing that contains a transmitter 992 and a receiver 993 to allow transmission and reception of data. The transmitter 992 and receiver 993 may be combined into a transceiver 997. An antenna 998 is attached to the housing and electrically coupled to the transceiver 997. Additional antennas may also be used.

The various components of the wireless communication device 902 are coupled together by a bus system 991 which may include a power bus, a control signal bus, and a status signal bus, in addition to a data bus. However, for the sake of clarity, the various buses are illustrated in FIG. 9 as the bus system 991. The wireless communication device 902 may also include a digital signal processor (DSP) 994 for use in processing signals. The wireless communication device 902 may also include a communications interface 995 that provides user access to the functions of the communication device 902. The wireless communication device 902 illustrated in FIG. 9 is a functional block diagram rather than a listing of specific components.

Figure 10:
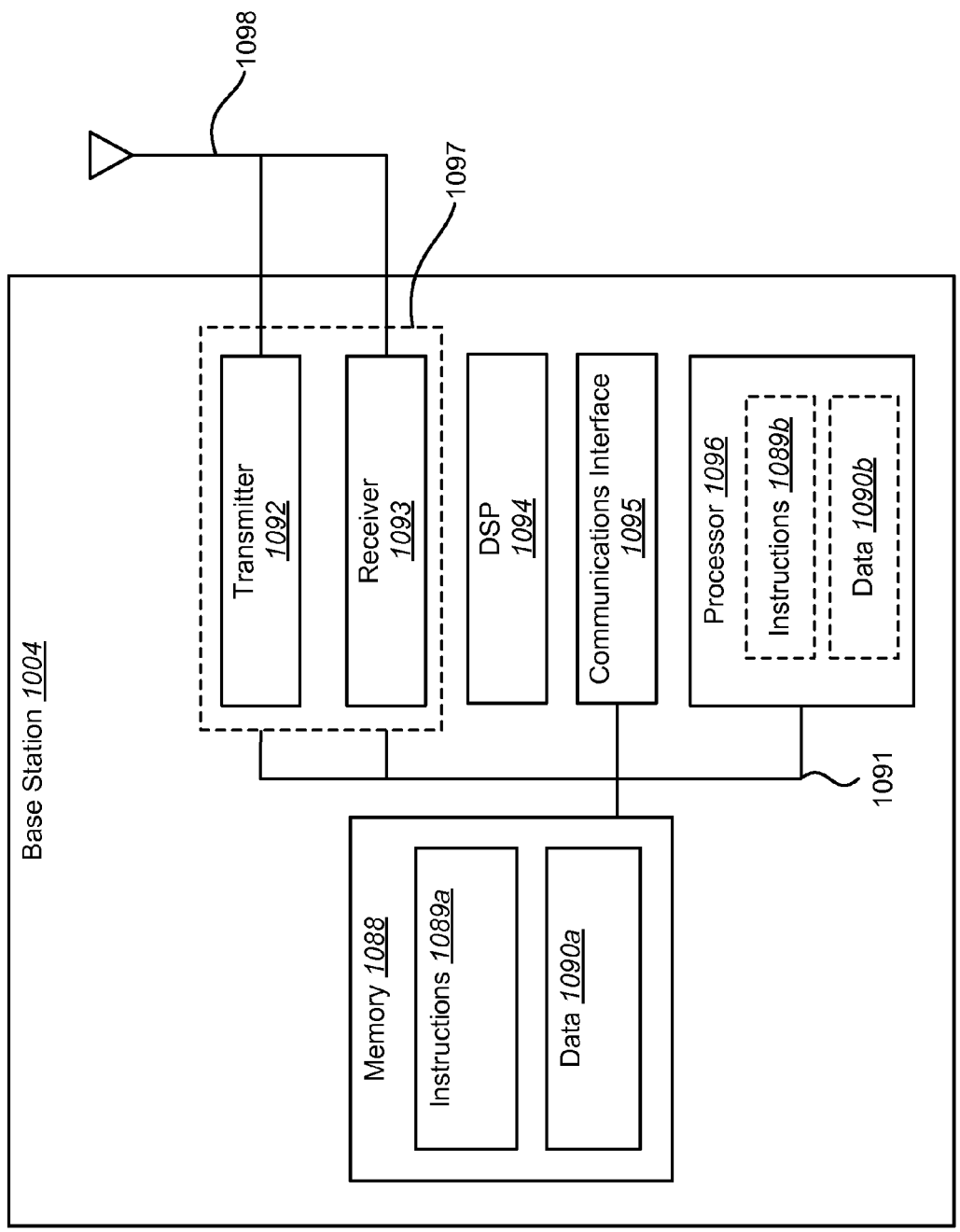
FIG. 10 illustrates various components that may be utilized in a base station.

FIG. 10 illustrates various components that may be utilized in a base station 1004. The base station 1004 may include components that are similar to the components discussed above in relation to the wireless communication device 902, including a processor 1006, memory 1088 that provides instructions 1089a and data 1090a to the processor 1096, instructions 1089b and data 1090b that may reside in the processor 1096, a housing that contains a transmitter 1092 and a receiver 1093 (which may be combined into a transceiver 1097), an antenna 1098 electrically coupled to the transceiver 1097, a bus system 1091, a DSP 1094 for use in processing signals, a communications interface 1095, and so forth.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for determining whether system information can be reused on a wireless communication device, the method comprising:
   reading system information that is specific to a target component carrier;
   reading a physical cell identity of a base station; and
   determining, by a wireless communication device, whether the physical cell identity of the target component carrier is the same as the physical cell identity of a source component carrier.

2. The method of claim 1 further comprising storing the system information that is specific to the target component carrier if the physical cell identity of the target component carrier is the same as the physical cell identity of the source component carrier.

3. The method of claim 1 further comprising, if the physical cell identity of the target component carrier is not the same as the physical cell identity of the source component carrier:
   reading system information that is generic to one or more component carrier(s);
   storing the physical cell identity of the target component carrier;
   storing the system information that is specific to the target component carrier; and
   storing the system information that is generic to one or more component carrier(s).

4. The method of claim 1 wherein the system information that is specific to the target component carrier comprises a MasterInformationBlock (MIB) and one or more SystemInformationBlocks (SIBs) pursuant to 3GPP LTE-A Release-8 specifications.

5. The method of claim 3 wherein the system information that is generic to one or more component carriers comprises one or more SystemInformationBlocks (SIBs) pursuant to 3GPP LTE-A Release-8 specifications.

6. The method of claim 1 wherein the wireless communication device is User Equipment (UE) pursuant to 3GPP LTE-A Release-8 specifications.

7. The method of claim 1 wherein the base station is an evolved Node B (eNB) pursuant to 3GPP LTE-A Release-8 specifications.

8. The method of claim 1 further comprising determining if a physical cell identity, system information that is specific to a component carrier and system information that is generic to one or more component carrier(s) are stored on the wireless communication device.

9. The method of claim 8 further comprising if the physical cell identity, system information that is specific to a component carrier or system information that is generic to one or more component carrier(s) is not stored on the wireless communication device:
   reading system information that is generic to one or more component carrier(s);
   storing the physical cell identity of the target component carrier;
   storing the system information that is specific to the target component carrier; and
   storing the system information that is generic to one or more component carrier(s).

10. The method of claim 1 further comprising determining if a data control variable of the target component carrier is the same as a data control variable of the source component carrier.

11. The method of claim 10 further comprising if the data control variable of the target component carrier is not the same as the data control variable of the source component carrier:
- reading system information that is generic to one or more component carrier(s);
- storing the physical cell identity of the target component carrier;
- storing the system information that is specific to the target component carrier; and
- storing the system information that is generic to one or more component carrier(s).

12. The method of claim 10 wherein the data control variable is a SystemInfoValueTag (SPIT) pursuant to 3GPP LTE-A Release-8 specifications.

13. A wireless communication device that is configured for determining whether system information can be reused on a wireless communication device, comprising:
- a processor;
- memory in electronic communication with the processor;
- instructions stored in the memory, the instructions being executable to:
  - read system information that is specific to a target component carrier;
  - read a physical cell identity of a base station; and
  - determine whether the physical cell identity of the target component carrier is the same as the physical cell identity of a source component carrier.

14. The wireless communication device of claim 13, the instructions being further executable to store the system information that is specific to the target component carrier if the physical cell identity of the target component carrier is the same as the physical cell identity of the source component carrier.

15. The wireless communication device of claim 13, wherein if the physical cell identity of the target component carrier is not the same as the physical cell identity of the source component carrier, the instructions are further executable to:
- read system information that is generic to one or more component carrier(s);
- store the physical cell identity of the target component carrier;
- store the system information that is specific to the target component carrier; and
- store the system information that is generic to one or more component carrier(s).

16. The wireless communication device of claim 13, the instructions being further executable to determine if a physical cell identity, system information that is specific to a component carrier and system information that is generic to one or more component carrier(s) are stored on the wireless communication device, wherein if the physical cell identity, system information that is specific to a component carrier or system information that is generic to one or more component carrier(s) is not stored on the wireless communication device, the instructions are further executable to:
- read system information that is generic to one or more component carrier(s);
- store the physical cell identity of the target component carrier;
- store the system information that is specific to the target component carrier; and
- store the system information that is generic to one or more component carrier(s).

* * * * *

UNITED STATES PATENT AND TRADEMARK OFFICE
CERTIFICATE OF CORRECTION

| | | |
|---|---|---|
| PATENT NO. | : 8,229,412 B2 | |
| APPLICATION NO. | : 12/572403 | |
| DATED | : July 24, 2012 | |
| INVENTOR(S) | : Kenneth James Park | |

It is certified that error appears in the above-identified patent and that said Letters Patent is hereby corrected as shown below:

In column 15, line 18 please delete "(SPIT)" and replace it with --(SIVT)--.

Signed and Sealed this
Eighteenth Day of December, 2012

David J. Kappos
*Director of the United States Patent and Trademark Office*